US010662884B2

(12) United States Patent
Northrup (10) Patent No.: US 10,662,884 B2
(45) Date of Patent: May 26, 2020

(54) POWER TRANSFER SYSTEM WITH CLUTCH PROTECTION THROUGH INTERACTION WITH OTHER VEHICLE SYSTEMS

(71) Applicant: Magna Powertrain of America, Inc., Troy, MI (US)

(72) Inventor: Benjamin Northrup, Bloomfield Hills, MI (US)

(73) Assignee: MAGNA POWERTRAIN OF AMERICA, INC., Troy, MI (US)

( * ) Notice: Subject to any disclaimer, the term of this patent is extended or adjusted under 35 U.S.C. 154(b) by 0 days.

(21) Appl. No.: 16/238,685

(22) Filed: Jan. 3, 2019

(65) Prior Publication Data

US 2019/0218983 A1    Jul. 18, 2019

Related U.S. Application Data

(60) Provisional application No. 62/618,213, filed on Jan. 17, 2018.

(51) Int. Cl.
*B60K 23/08* (2006.01)
*F02D 41/02* (2006.01)
*F16D 13/52* (2006.01)
*F02D 35/00* (2006.01)

(52) U.S. Cl.
CPC ............ *F02D 41/021* (2013.01); *B60K 23/08* (2013.01); *F02D 35/00* (2013.01); *F02D 41/022* (2013.01); *F16D 13/52* (2013.01); *F02D 2200/50* (2013.01); *F02D 2200/501* (2013.01); *F02D 2200/602* (2013.01); *F02D 2250/18* (2013.01)

(58) Field of Classification Search
CPC ...... F02D 41/021; F02D 41/022; B60K 23/08
See application file for complete search history.

(56) References Cited

U.S. PATENT DOCUMENTS 8,321,115 B2 * 11/2012 Oral ............... B60W 30/18172
701/85
8,626,417 B2 *  1/2014 Oral ............... B60W 30/18172
701/85
9,925,869 B2 *  3/2018 Sharma .................. B60K 17/08

FOREIGN PATENT DOCUMENTS

DE         3810013 A1    10/1989
DE        10122158 A1    11/2002
(Continued)

OTHER PUBLICATIONS

Office Action dated Jul. 30, 2019 from corresponding German patent application No. DE 10 2019 200 325.7.

*Primary Examiner* — Derek D Knight
(74) *Attorney, Agent, or Firm* — Dickinson Wright PLLC (57) ABSTRACT

A power transfer assembly for a motor vehicle includes a clutch protection system to prevent damage to an actively-controlled multi-plate mode clutch of the power transfer assembly. The clutch protection system includes a transfer case control module (TCCM) and an engine control module (ECM) configured to regulate the distribution of torque applied from an engine to front and rear output shafts of the power transfer assembly. The TCCM is in operable communication with the engine control module ECM, wherein TCCM is configured to detect slip in the actively-controlled multi-plate friction clutch and to communicate with the ECM to selectively reduce the output torque of the engine in response to detected slip.

20 Claims, 9 Drawing Sheets

(56) References Cited

FOREIGN PATENT DOCUMENTS

EP       1398520 A2    3/2004
WO   WO2016135029 A1  9/2016

* cited by examiner

POWER TRANSFER SYSTEM WITH CLUTCH PROTECTION THROUGH INTERACTION WITH OTHER VEHICLE SYSTEMS

CROSS REFERENCE TO RELATED APPLICATION

This patent application claims the benefit of U.S. Provisional Patent Application Ser. No. 62/618,213, filed Jan. 17, 2018. The entire disclosure of the above application being considered part of the disclosure of this application, and hereby incorporated by reference.

FIELD

The present disclosure relates generally to power transfer systems for controlling the distribution of drive torque from a powertrain to front and rear drivelines of a four-wheel drive (4WD) or an all-wheel drive (AWD) motor vehicle. More specifically, the present disclosure is directed to a clutch protection system of the type used in power transfer assemblies, such as transfer cases and power take-off units, to actively prevent damage to a multi-plate clutch assembly.

BACKGROUND

This section provides background information which is not necessarily prior art to the inventive concepts associated with the present disclosure.

Interest in four-wheel drive (4WD) and all-wheel drive (AWD) vehicles has led to development of power transfer systems configured to selectively and/or automatically direct rotary power (i.e. drive torque) from the powertrain to all four wheels of the vehicle. In many 4WD vehicles, the power transfer system includes a transfer case configured to selectively transmit drive torque from the powertrain to the front driveline. In AWD vehicles, the power transfer system includes a power take-off unit (commonly referred to as a "PTU") configured to selectively transmit drive torque from the powertrain to the rear driveline.

Many current transfer cases are configured to include a rear output shaft interconnecting the powertrain to the rear driveline, a front output shaft interconnected to the front driveline, a transfer assembly drivingly interconnected to the front output shaft, a mode clutch for selectively coupling the transfer assembly to the rear output shaft, and a clutch actuator for controlling actuation of the mode clutch. The mode clutch is operable in a first or "released" state to disconnect the front output shaft from the rear output shaft and establish a two-wheel drive mode (2WD) with all drive torque transmitted from the powertrain to the rear driveline. The mode clutch is also operable in a second or "engaged" state to drivingly connect the front output shaft (via the transfer assembly) to the rear output shaft and establish a four-wheel drive mode (4WD) with drive torque transmitted from the powertrain to both of the front and rear drivelines.

Some "part-time" transfer cases are equipped with a positive-locking type of mode clutch, such as a dog clutch, which can be selectively actuated to shift between the two-wheel drive mode (2WD) and a locked four-wheel drive mode (LOCK-4WD). As an alternative, "active" transfer cases are equipped with an on-demand mode clutch, such as an adaptively-controlled multi-plate friction clutch, configured to automatically control the drive torque distribution between the front and rear drivelines without any input or action on the part of the vehicle operator, so as to provide an on-demand four-wheel drive mode (AUTO-4WD) in addition to the two-wheel drive mode (2WD). Typically, active transfer cases include a power-operated clutch actuator that is interactively associated with an electronic traction control system having a plurality of vehicle sensors. The power-operated clutch actuator regulates the magnitude of a clutch engagement force applied to the multi-plate friction clutch based on vehicular and/or road conditions detected by the sensors, thereby adaptively regulating the drive torque distribution ratio between the front and rear drivelines.

Vehicle scenarios exist in which the transfer case clutch can become damaged. One known scenario occurs when a sudden and relatively large differential speed results between the front output and rear output shafts of the actively-controlled multi-plate transfer case. Such a difference in speed between the front and rear output shafts can occur during simultaneous depression of a throttle pedal and brake pedal, wherein the front tires are stopped from rotation via sufficiently sized front brakes, while the rear tires, particularly on a low coefficient of friction road surface, can be permitted to rotate. In such scenario, the transfer case software may identify the rear wheel slip and attempt to equalize the front and rear wheel speeds by increasing the transfer case clutch torque capacity, up to the maximum clutch torque capacity. As such, the combination of high torque capacity and high level of slip can quickly increase the operating temperature of the transfer case clutch, resulting in damage thereof.

SUMMARY

This section provides a general summary of some of the inventive concepts associated with the present disclosure and is not intended to be interpreted as a complete and exhaustive listing of all of its aspects, objectives and embodiments.

It is an aspect of the present disclosure to provide a power transfer assembly for a motor vehicle with a clutch protection system to prevent damage to an actively-controlled multi-plate mode clutch thereof.

It is a related aspect of the present disclosure to provide the clutch protection system with an ability to prevent damage to an actively-controlled multi-plate mode clutch during a scenario of large speed differences between a front output shaft and rear output shaft of the power transfer assembly.

It is a further related aspect of the present disclosure to provide the clutch protection system with an ability to reduce the torque applied through a driveline at the onset of a wheel slip condition to reduce the potential for heat buildup within the actively-controlled multi-plate mode clutch.

It is a further related aspect of the present disclosure to provide the clutch protection system with an ability to reduce the torque output of an engine at the onset of high differential speeds between the transfer case front and rear output shafts to reduce the potential for heat buildup within the actively-controlled multi-plate mode clutch.

In furtherance of these aspects, the present disclosure is further directed to enhancing vehicle stability via the clutch protection system by reducing the amount of driveline torque at the onset of high differential speeds between the transfer case front and rear output shafts, thereby reducing the potential for tire slip on a road surface, and further to alerting the driver to the onset of a high differential speed condition between the transfer case front and rear output shaft, thereby altering the driving behavior of the driver and ultimately reducing the potential of damage to the actively-controlled multi-plate mode clutch.

In accordance with these and other aspects, the present disclosure is directed to a power transfer assembly for installation in a motor vehicle and which is operable to normally transmit drive torque from a powertrain to a primary driveline and to selectively transmit drive torque to a secondary driveline through an actively-controlled multi-plate friction clutch. The power transfer assembly further includes a power-operated clutch actuator operable to apply a clutch engagement force to the actively-controlled multi-plate friction clutch to regulate distribution of torque to the secondary driveline. The power-operated clutch actuator is in operable communication with a transfer case control module (TCCM), wherein the TCCM is configured to regulate the distribution of torque applied to the front and rear output shafts. The TCCM is in operable communication with an engine control module (ECM), wherein the ECM is configured to regulate the output torque of the powertrain. The TCCM is configured to detect slip in the actively-controlled multi-plate friction clutch and to communicate with the ECM to request a reduction of the output torque of the powertrain in response to detected slip.

In accordance with another aspect of the disclosure, the transfer case control module may be configured to reduce the output torque of the powertrain via communication with the engine control module in response to signals from vehicle sensors other than from the actively-controlled multi-plate friction clutch.

In accordance with another aspect of the disclosure, the transfer case control module may be configured to request a reduction in output torque from the engine control module upon detecting a predetermined driver input condition representing one or more control inputs from a driver of the motor vehicle, and a predetermined vehicle condition.

In accordance with another aspect of the disclosure, the predetermined driver input condition may include a brake control being activated and simultaneously a throttle control being activated.

In accordance with another aspect of the disclosure, the predetermined vehicle condition may include a slip condition in the actively-controlled multi-plate friction clutch, and one or more of: a vehicle speed below a predetermined threshold, a longitudinal acceleration of the vehicle below a predetermined threshold, and/or a lateral acceleration of the vehicle below a predetermined threshold.

In accordance with another aspect of the disclosure, the transfer case control module may be configured to maintain the request to the engine control module for the reduction in output torque until the slip condition in the actively-controlled multi-plate friction clutch is less than a predetermined threshold.

In accordance with another aspect of the disclosure, the transfer case control module may be configured to request an increase in output torque from the engine control module upon the slip condition in the actively-controlled multi-plate friction clutch being less than a predetermined threshold.

In accordance with another aspect of the disclosure, the transfer case control module may be configured to request a relatively fast increase in engine torque output from the engine control module upon the slip condition in the actively-controlled multi-plate friction clutch being less than the predetermined threshold and when a throttle control of the motor vehicle is in a low throttle position.

In accordance with another aspect of the disclosure, the transfer case control module may be configured to request a relatively slow gradual increase in engine torque output from the engine control module upon the slip condition in the actively-controlled multi-plate friction clutch being less than the predetermined threshold and when a throttle control of the motor vehicle is in a high throttle position.

In accordance with these and other aspects, the present disclosure is also directed to a power transfer assembly for installation in a motor vehicle and which is operable to normally transmit drive torque from an engine to a primary driveline and to selectively transmit drive torque to a secondary driveline through an actively-controlled multi-plate friction clutch. The power transfer assembly further includes a power-operated clutch actuator operable to apply a clutch engagement force to the actively-controlled multi-plate friction clutch to regulate distribution of torque to the secondary driveline. The power-operated clutch actuator is in operable communication with a transfer case control module (TCCM), wherein the TCCM is configured to regulate the distribution of torque applied to the front and rear output shafts. The TCCM is in operable communication with an engine control module (ECM), wherein the ECM is configured to regulate the output torque of the engine. The TCCM is configured to detect slip in the actively-controlled multi-plate friction clutch and to communicate with the ECM to request a reduction of the output torque of the powertrain in response to detected slip in the actively-controlled multi-plate friction clutch.

In accordance with another aspect of the disclosure, the transfer case control module may be configured to request a reduction in output torque from the engine control module upon detecting a predetermined driver input condition representing one or more control inputs from a driver of the motor vehicle and a predetermined vehicle condition.

It is another aspect of the present disclosure to provide a method of controlling a powertrain of a motor vehicle including regulating a distribution of drive torque between a primary driveline and a secondary driveline by an actively-controlled multi-plate friction clutch in a power transfer assembly. A slip condition in the actively-controlled multi-plate friction clutch is detected by a transfer case control module as a difference in rotational speed between output shafts coupled to corresponding ones of the primary driveline and the secondary driveline. Output torque supplied by an engine to the power transfer assembly is reduced in response to detecting slip in the power transfer assembly.

In accordance with another aspect of the disclosure, the output torque of the engine may be reduced in response to a signal from one or more vehicle sensors other than the actively-controlled multi-plate friction clutch.

In accordance with another aspect of the disclosure, the output torque of the engine may be reduced in response to a predetermined driver input condition representing one or more control inputs from a driver of the motor vehicle and a predetermined vehicle condition.

In accordance with another aspect of the disclosure, the predetermined driver input condition may include a brake control being activated and simultaneously a throttle control being activated.

In accordance with another aspect of the disclosure, the predetermined vehicle condition may include a slip condition in the actively-controlled multi-plate friction clutch, and one or more of: a vehicle speed below a predetermined threshold, a longitudinal acceleration of the vehicle below a predetermined threshold, and/or a lateral acceleration of the vehicle below a predetermined threshold.

In accordance with another aspect of the disclosure, the output torque of the engine may be reduced until the slip in the actively-controlled multi-plate friction clutch is less than a predetermined threshold.

In accordance with another aspect of the disclosure, the method may further comprise requesting, by the transfer case control module, an increase in output torque of the engine control module upon the slip condition in the actively-controlled multi-plate friction clutch being less than a predetermined threshold.

In accordance with another aspect of the disclosure, the transfer case control module may request a relatively fast increase in engine torque output from the engine control module upon the slip condition in the actively-controlled multi-plate friction clutch being less than the predetermined threshold and when a throttle control is in a low throttle position.

In accordance with another aspect of the disclosure, the transfer case control module may request a relatively slow gradual increase in engine torque output from the engine control module upon the slip condition in the actively-controlled multi-plate friction clutch being less than the predetermined threshold and when a throttle control is in a high throttle position.

Further areas of applicability will become apparent from the description provided herein. As noted, the description and specific embodiments disclosed in this summary are intended for purposes of illustration only and are not intended to limit the scope of the present disclosure.

DRAWINGS

The drawings described herein are only for purposes of illustrating selected embodiments and not all implementations or variations thereof. As such, the drawings are not intended to limit the scope of the inventive concepts associated with the present disclosure. In the drawings.

Corresponding reference numerals are used throughout the various views provided in the above-noted drawings to identify common components.

DETAILED DESCRIPTION

Example embodiments of a power transfer assembly for use in motor vehicles having an actively-controlled multi-plate friction clutch and power-operated clutch actuator will now be described. Specifically, a transfer case control module (TCCM) is both configured to regulate the distribution of torque applied to front and rear output shafts of the power transfer assembly and to detect slip in the actively-controlled multi-plate friction clutch, whereupon the TCCM communicates with an engine control module (ECM) to reduce the output torque of the powertrain in response to the detected slip to: reduce the potential for damage to the actively-controlled multi-plate friction clutch; reduce the potential for wheels to lose traction with a road surface, and provide the driver with real-time feedback to alert the driver to a potential tire and/or clutch slip condition. However, it is to be recognized that these and the following specific example embodiments are provided so that this disclosure will be thorough and will fully convey the intended scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known device structures and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top," "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

Figure 1:
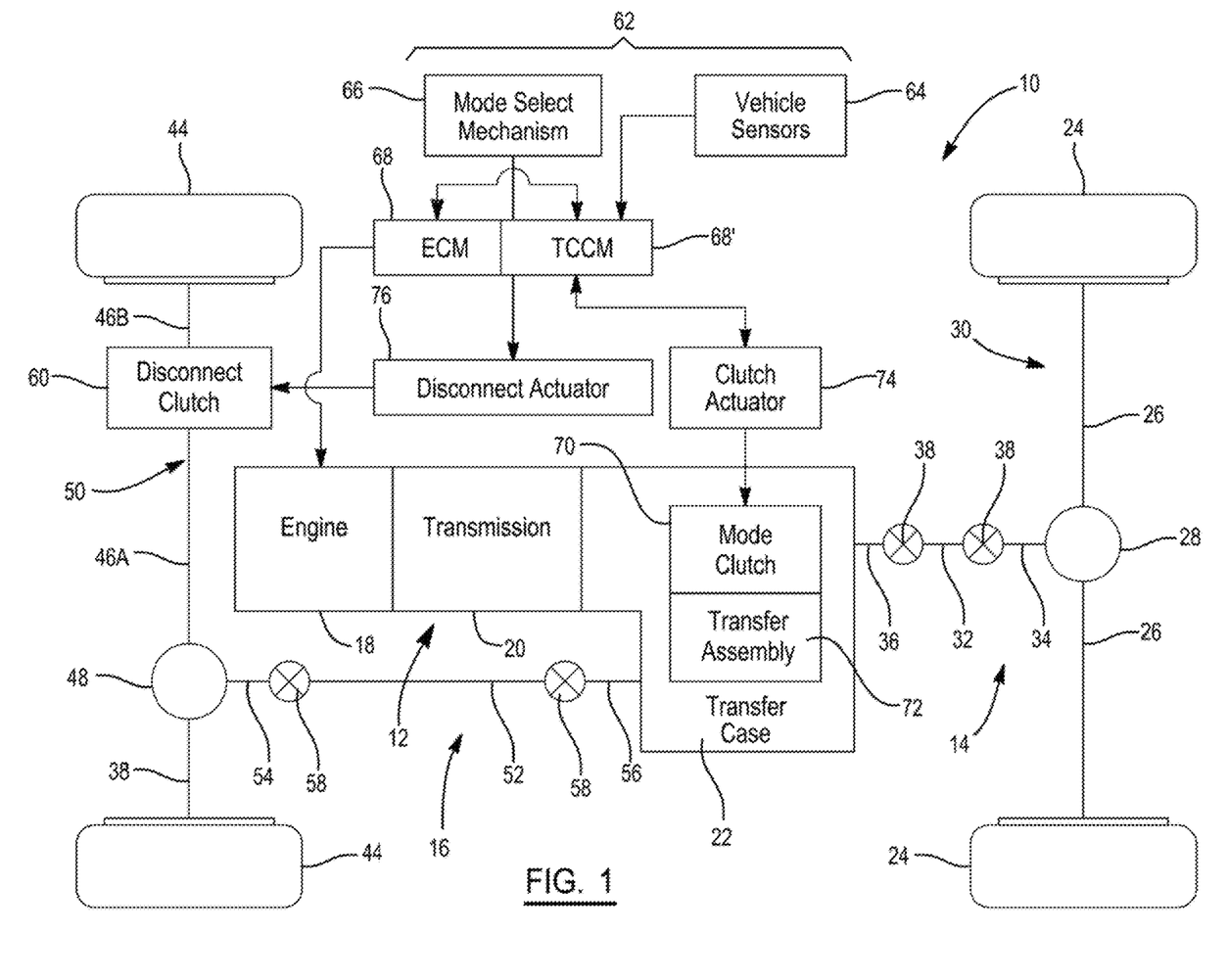
FIG. 1 is a schematic illustration of a four-wheel drive motor vehicle configured to be equipped with a power transfer assembly, such as a transfer case, having a ballramp type of force generating mechanism with cam rings constructed in accordance with the teachings of the present disclosure.

Referring initially to FIG. 1 of the drawings, an example of a four-wheel drive motor vehicle 10 is shown to generally include a longitudinally-extending (i.e. north/south configuration) powertrain 12 including an engine 18 and a transmission 20 operable for generating rotary power (i.e. drive torque) to be transmitted to a primary driveline 14 and a secondary driveline 16. Powertrain 12 is shown to include an internal combustion engine 18, a multi-speed transmission 20, and a power transfer assembly hereinafter referred to as transfer case 22. In the particular arrangement shown, primary driveline 14 is the rear driveline and secondary driveline 16 is the front driveline so as to establish a four-wheel drive (4WD) arrangement. It is contemplated that an all-wheel drive (AWD) arrangement can be configured in the alternative with front driveline 16 acting as the primary driveline and rear driveline 14 acting as the secondary driveline. In such an arrangement, the power transfer assembly would be configured as a power take-off unit.

Rear driveline 14 is configured to include a pair of ground-engaging rear wheels 24 drivingly connected via corresponding rear axleshafts 26 to a rear differential assembly 28 associated with a rear axle assembly 30. Rear driveline 14 also includes a rear propshaft 32 arranged to interconnect a rotary input 34 of rear differential assembly 28 to a rear output shaft 36 of transfer case 22. A pair of rear joint units 38 are shown to interconnect opposite ends of rear propshaft 32 to rotary input 34 of rear differential assembly 28 and rear output shaft 36 of transfer case 22 and which function to transmit drive torque while permitting angular and/or translational movement therebetween.

Front driveline 16 is configured to include a pair of front ground-engaging wheels 44 drivingly interconnected via corresponding front axleshafts 46 to a front differential assembly 48 associated with a front axle assembly 50. Front driveline 16 also includes a front propshaft 52 arranged to interconnect a rotary input 54 of front differential assembly 48 to a front output shaft 56 of transfer case 22. A pair of front joint units 58 interconnect opposite ends of front propshaft 52 to rotary input 54 of front differential assembly 48 and front output shaft 56 of transfer case 22 and function to transmit drive torque while permitting angular and/or translational movement therebetween. A disconnect coupling 60 is also associated with front driveline 16 and is shown operably disposed between a pair of shaft segments 46A, 46B of one of front axleshafts 46. Disconnect coupling 60 is operable in a first or "connected" mode to drivingly couple front wheels 44 to the remainder of front driveline 16 and is further operable in a second or "disconnected" mode to uncouple front wheels 44 from driven connection with the reminder of front driveline 16.

Powertrain 12 is also shown in FIG. 1 to be operably associated with a powertrain control system 62 generally including a group of vehicle sensors 64 and a mode selector 66, both of which provide signals which communicate with a vehicle controller, wherein the vehicle controller can include one or more individual controllers associated with engine 18, transmission 20, transfer case 22 and disconnect coupling 60 which are configured to control motive operation of vehicle 10, with the vehicle controller being illustrated as including an engine control unit, also referred to as engine control module (ECM) 68 and a transfer case control unit, also referred to as transfer case control module (TCCM) 68', with ECM 68 and TCCM 68' being configured in electrical communication with one another, as discussed further below. Powertrain control system 62 is shown to provide an electronically-controlled power transfer system configured to permit a vehicle operator to select between a two-wheel drive (2WD) mode, a part-time or "locked" four-wheel drive (LOCK-4WD) mode, and an adaptive or "on-demand" four-wheel drive (AUTO-4WD) mode. In this regard, transfer case 22 is equipped with an actively-controlled multi-plate mode clutch 70 and a transfer assembly 72 configured to transfer drive torque to front driveline 16 when one of the four-wheel drive modes is selected. As will be detailed hereafter with greater specificity, mode clutch 70 functions to selectively transmit drive torque from rear output shaft 36 to front output shaft 56 via transfer assembly 72.

The power transfer system is shown to also include a power-operated clutch actuator 74 for controlling actuation of mode clutch 70, and a power-operated disconnect actuator 76 for controlling actuation of disconnect coupling 60. TCCM 68' controls coordinated actuation of power-operated actuators 74, 76 in response to input signals from vehicle sensors 64 and mode signals from mode select mechanism 66. Vehicle sensors 64 are arranged and configured to detect certain dynamic and operational characteristics of vehicle 10 and/or current weather or road conditions.

To establish the 2WD mode, clutch actuator 74 is controlled to shift mode clutch 70 into a first or "released" mode while disconnect actuator 76 is controlled to shift disconnect coupling 60 into its disconnected mode. With mode clutch 70 in its released mode, drive torque is not transmitted through transfer assembly 72 to front output shaft 56 such that virtually all drive torque generated by powertrain 12 is delivered to rear wheels 24 via rear driveline 14.

To establish the LOCK-4WD mode, disconnect actuator 76 is controlled to shift disconnect coupling 60 into its connected mode and clutch actuator 74 is controlled to shift mode clutch 70 into a second or "fully-engaged" mode. With mode clutch 70 operating in its fully-engaged mode, rear output shaft 36 is, in effect, directly coupled to front output shaft 56 via transfer assembly 72 such that drive torque is equally distributed (i.e. 50/50) therebetween. With disconnect coupling 60 in its connected mode, shaft segments 46A, 46B are drivingly coupled together such that drive torque delivered to front output shaft 56 is transferred via front driveline 16 to front wheels 44.

To establish the AUTO-4WD mode, disconnect coupling 60 is shifted into, or maintained in, its connected mode and clutch actuator 74 operates to adaptively regulate the drive torque distribution between rear output shaft 36 and front output shaft 56 by varying operation of mode clutch 70 between its released and fully-engaged modes. The torque distribution ratio is based on and determined by control logic associated with TCCM 68' which is configured to determine a desired or "target" amount of the total drive torque to be transmitted to front output shaft 56 based on the operating characteristics and/or road conditions detected by sensors 64.

Figure 2:
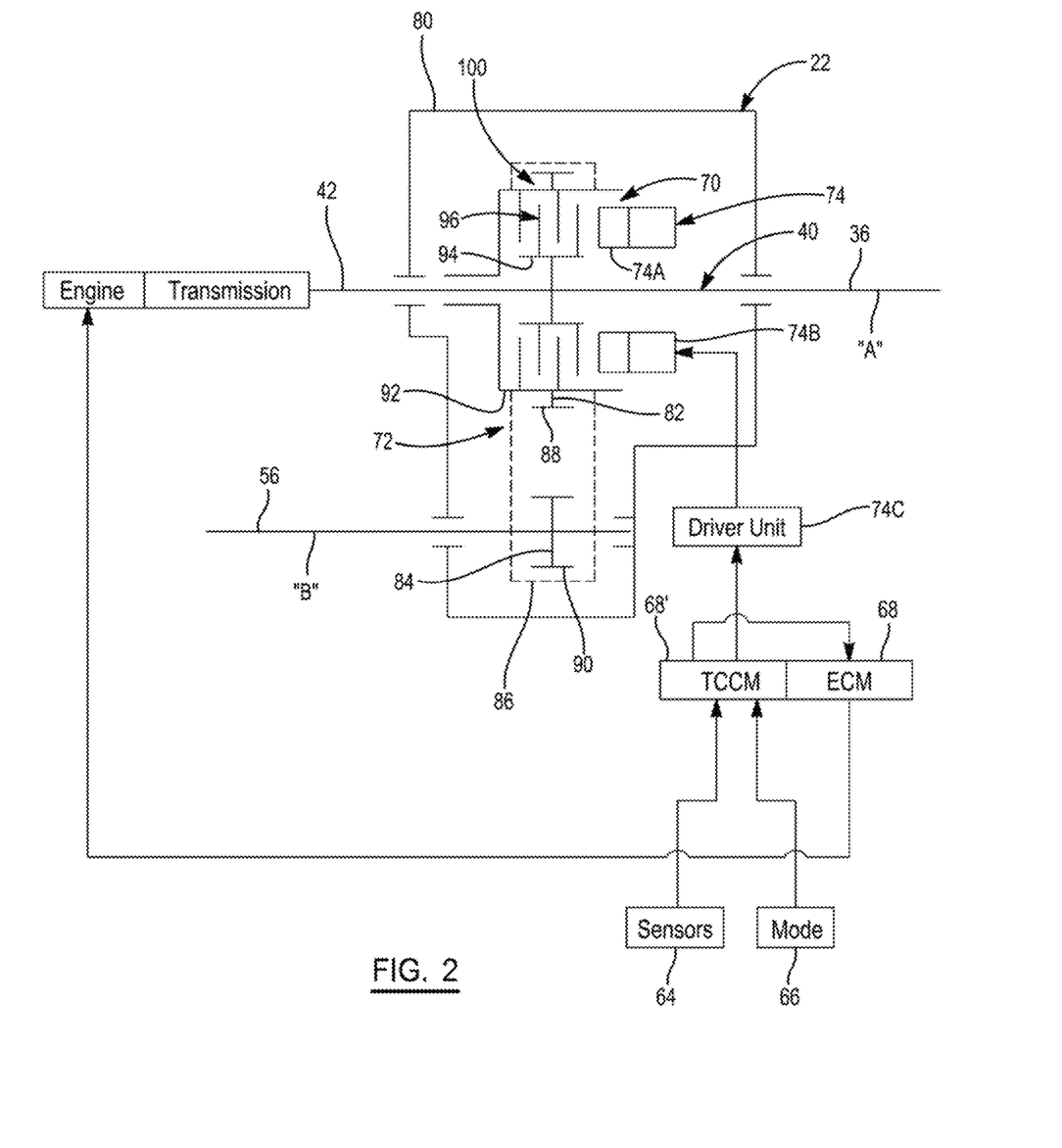
FIG. 2 is a diagrammatical illustration of a transfer case configured for installation in the motor vehicle shown in FIG. 1.

Referring now to FIG. 2 of the drawings, an example embodiment of transfer case 22 will now be described in detail. Transfer case 22 generally includes a t-case housing 80, rear output shaft 36, front output shaft 56, transfer assembly 72, mode clutch 70, and power-operated clutch actuator 74. In this non-limiting example, a component of transfer assembly 72 is combined with a component of mode clutch 70 to define an "integrated torque transfer" component which facilitates a compact "stacking" arrangement between mode clutch 70 and transfer assembly 72. This stacked arrangement results in a reduced axial packaging of transfer case 22 in comparison to "unstacked" arrangements in known transfer cases. In the particular example disclosed, the integrated torque transfer component combines a first transfer member or first sprocket 82 of transfer assembly 72 with a first clutch member or clutch drum 92 of mode clutch 70, hereinafter the combined component being cumulatively referred to as a sprocket drum 100. Sprocket drum 100 is rotatably supported on rear output shaft 36.

In addition to first sprocket 82, transfer assembly 72 also includes a second transfer member or second sprocket 84 that is fixed to, or formed integrally with, front output shaft 56, and a continuous power chain 86 encircling and meshed with first sprocket teeth 88 formed on first sprocket 82 of sprocket drum 100 and with second sprocket teeth 90 formed on second sprocket 82. Transfer assembly 72 is of the chain and sprocket type and provides a direct (1:1) ratio between first sprocket 82 and second sprocket 84. If desired, non-direct ratios may be provided by transfer assembly 72. Transfer case 22, as shown in FIG. 2, is a one-speed configuration with a mainshaft 40 having an input shaft 42 and rear output shaft 36 formed integrally into a common shaft. Input shaft 42 is adapted to be drivingly connected to an output shaft of transmission 20 so as to receive the drive torque from powertrain 12.

With continued attention primarily to FIG. 2, transfer case 22 is shown with mainshaft 40, mode clutch 70, and clutch actuator 74 operably arranged with respect to a first rotary axis "A". Mode clutch 70 is shown, in this non-limiting configuration, to be a multi-plate friction clutch generally including clutch drum 92 rotatably supported on mainshaft 40, a second clutch member or clutch hub 94 fixed for rotation with mainshaft 40, and a multi-plate clutch pack 96 comprised of a plurality of interdigitated first and second clutch plates. The first clutch plates are coupled via a splined or lugged drive connection 98 (FIG. 3) with clutch hub 94 while the second clutch plates are coupled via a splined or lugged drive connection 102 (FIG. 3) with clutch drum 92. First sprocket teeth 88 of first sprocket 82 and the internal splines/lugs associated with drive connection 102 are formed in sprocket drum 100 to provide the integrated torque transfer component.

Power-operated clutch actuator 74 is schematically shown in FIG. 2 configured to include a moveable actuation component that is adapted to engage and apply a compressive clutch engagement force on clutch pack 96. As will be understood, movement of this actuation component in an engagement direction (i.e. toward clutch pack 96) increases the magnitude of the clutch engagement force and the corresponding amount of drive torque transferred from mainshaft 40 to front output shaft 56 via transfer assembly 72. Likewise, movement of the actuation component in a releasing direction (i.e. away from clutch pack 96) decreases the magnitude of the clutch engagement force and the corresponding amount of drive torque transmitted from mainshaft 40 to front output shaft 56 via transfer assembly 72.

Clutch actuator 74 is shown, in this non-limiting embodiment, to generally include moveable actuation component 74A, a force generating mechanism 74B, and a powered driver unit 74C. The moveable actuation component is configured as a pressure plate 74A that is axially-moveable relative to clutch pack 96. Force generating mechanism 74B is actuated by powered driver unit 74C and is operable to generate and exert the axially-directed clutch engagement force for moving pressure plate 74A relative to clutch pack 96. Powered driver unit 74C can include, without limitations, an electric motor, an electromagnetic actuator, a hydraulic power pack (i.e., motor-driven fluid pump) or the like. Similarly, force generating mechanism 74B may include, without limitation, a rotary-to-linear conversion device (i.e., ball ramp unit, spindle-drive unit, etc.) a pivot actuator or a linear actuator.

Figure 3:
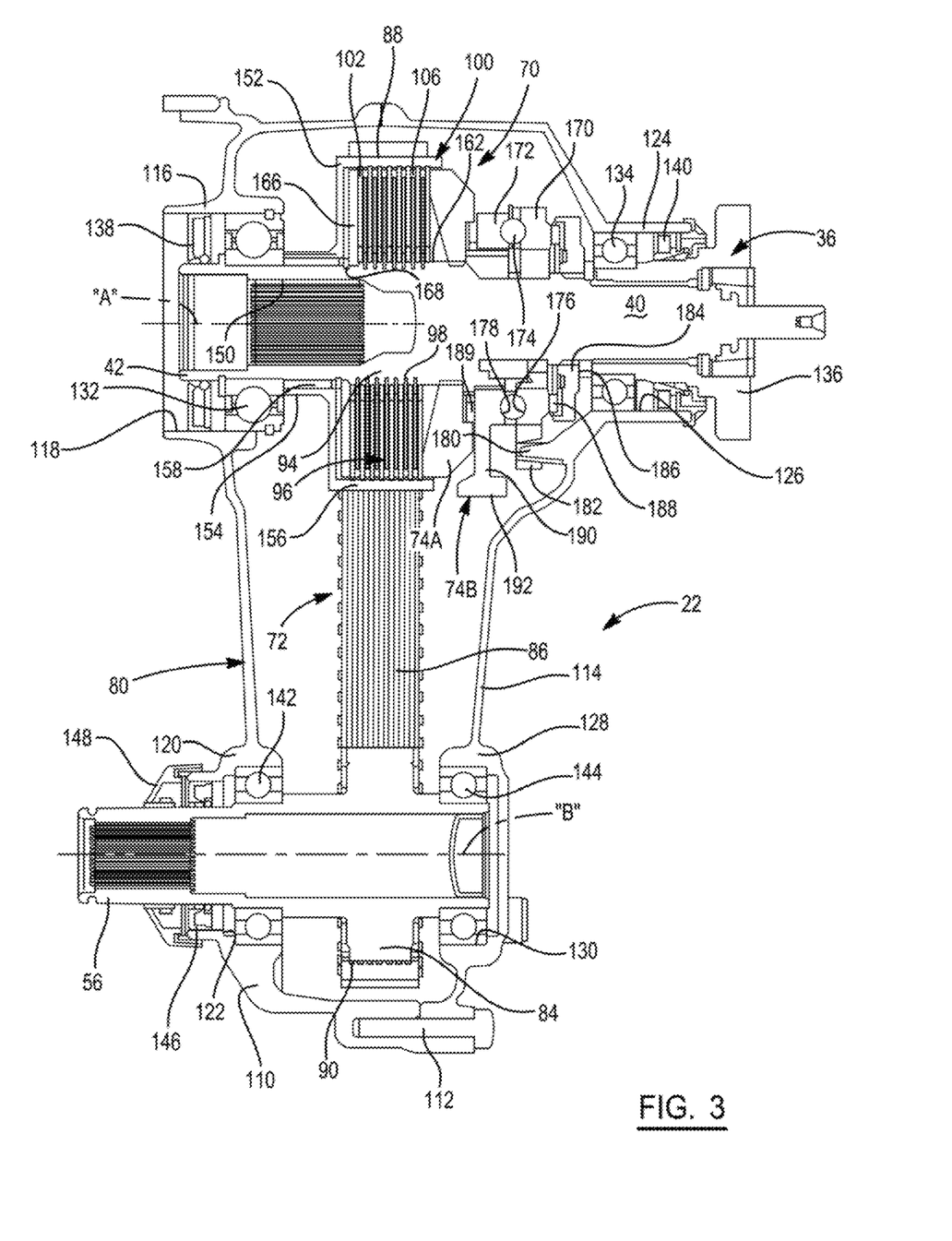
FIG. 3 is a sectional view of a transfer case constructed in accordance with a first non-limiting embodiment.
Figure 4:
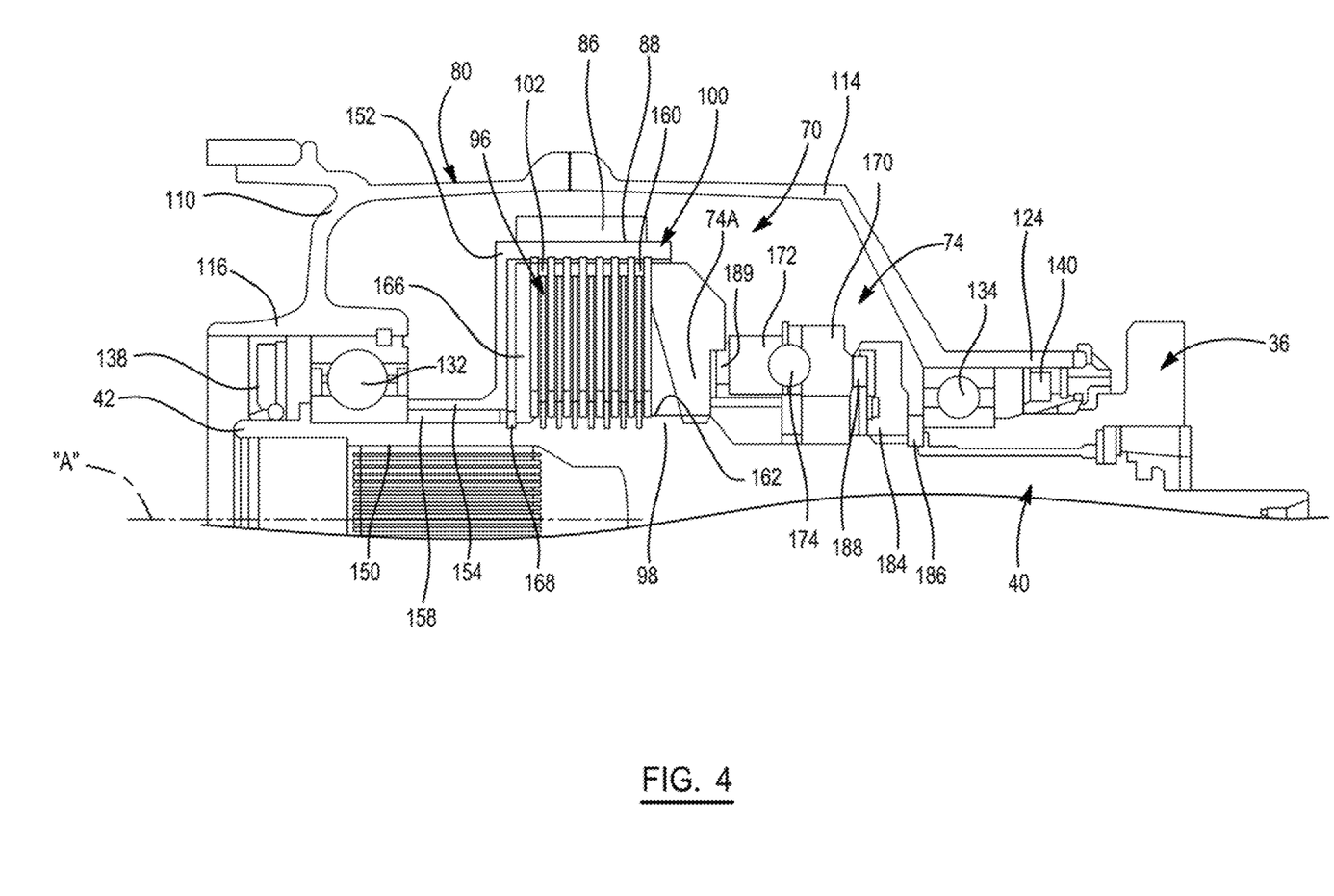
FIG. 4 is an enlarged partial view of the multi-plate friction clutch and the power-operated clutch actuator associated with the transfer case shown in FIG. 3.

Referring now to FIGS. 3 and 4, sectional views of a non-limiting embodiment of transfer case 22 is shown with mainshaft 40 aligned for rotation about first rotary axis "A" while front output shaft 56 is shown aligned for rotation about a second rotary axis "B". Housing 80 is shown as a two-piece construction having a first housing section 110 secured via a plurality of fasteners 112 to a second housing section 114. First housing section 110 includes an annular input boss segment 116 defining an input aperture 118, and an annular front output boss segment 120 defining a front output aperture 122. Second housing section 114 includes an annular rear output boss segment 124 defining a rear output aperture 126, and an annular front output boss segment 128 defining a bearing support cavity 130. A first bearing assembly 132 is shown rotatably supporting input shaft 42 of mainshaft 40 in input aperture 118, while a second bearing assembly 134 is shown rotatably supporting a yoke coupling 136 fixed to rear output shaft 36 in rear output aperture 126. First and second rotary seals 138, 140 are also respectively disposed within input aperture 118 and rear output aperture 126. A third bearing assembly 142 is shown rotatably supporting one portion of front output shaft 56 within front output aperture 122, while a fourth bearing assembly 144 rotatably supports another portion of first output shaft 56 within bearing support cavity 130. A rotary seal 146 is also disposed within front output aperture 122 while a deflector ring 148 fixed for rotation with front output shaft 56 generally surrounds front output boss segment 120 of first housing section 114. Input shaft 42 of mainshaft 40 is shown to include an internally-splined drive cavity 150 adapted to receive and mesh with an externally-splined output shaft of transmission 20.

With continued reference to FIGS. 3 and 4, sprocket drum 100 of the stacked and integrated arrangement between transfer assembly 72 and mode clutch 70 is generally shown to include a radial plate segment 152, a smaller diameter axially-extending tubular hub segment 154, and a larger diameter axially-extending sprocket/drum segment 156. Hub segment 154 of sprocket drum 100 surrounds input shaft 42 of mainshaft 40 and is rotatably supported thereon via a fifth bearing assembly 158. The external peripheral surface of sprocket/drum segment 156 includes first sprocket teeth 88 which extend outwardly therefrom while the internal peripheral surface of sprocket/drum segment 156 includes internal spline teeth 160 configured to mesh with the external spline teeth of the second clutch plates of clutch pack 96 to define drive connection 102. First sprocket teeth 88 and internal spline teeth 160 are integrally formed to extend from sprocket/drum segment 156 of sprocket drum 100. Clutch hub 94 is shown to be integrally formed on an intermediate portion of mainshaft 40 and has external spline teeth 162 configured to mesh with the internal spline teeth of the first clutch plates of clutch pack 96 to define drive connection 98 therebetween. Mode clutch 70 is also shown to include a reaction plate 166 fixed for rotation with mainshaft 40 and which is positively axially located within a clutch chamber formed between radial plate segment 152 and sprocket drum segment 156 of sprocket drum 100 via a retainer ring 168. Reaction plate 166 is configured to react the axially-directed clutch engagement forces applied to clutch pack 96 within the clutch chamber so as to minimize the loading applied to sprocket drum 100.

Force generating mechanism 74B is shown in FIGS. 3 and 4 to include a ball-ramp unit having a stationary first cam ring 170, a moveable second cam ring 172, and a plurality of balls 174 each disposed between an aligned pair of first cam track 176 and second cam track 178 that are respectively formed in first and second cam rings 170, 172. Stationary first cam ring 170 is restrained rotationally via engagement of an anti-rotational lug 180 extending from second housing section 114 within an anti-rotation aperture 182 formed in first cam ring 170. Likewise, first cam ring 170 is axially restrained adjacent to a locator plate 184. Locator plate 184 is fixed (i.e. splined) for rotation with rear output shaft 36 and is axially restrained via a retainer ring 186. A sixth bearing assembly, in the form of a radial thrust bearing unit 188, is disposed between locator plate 184 and first cam ring 170.

The second cam ring 172 is configured to be both rotatably moveable and axially moveable relative to first cam ring 170 to create and transfer the clutch engagement force through pressure plate 74A to clutch pack 96. Second cam ring 172 is shown to include an extension 190 having gear teeth 192 formed along its peripheral edge surface. Rotation of second cam ring 172 relative to first cam ring 170 is caused by rotation of a toothed output component of powered driver unit 74C that is meshed with gear teeth 192. As a result of rotation of second cam ring 172 relative to first cam ring 170, rolling movement of balls 174 within the aligned set of "profiled" cam tracks 176, 178 causes second cam ring 172 to translate axially in one of a first or "engaging" direction toward clutch pack 96 and a second or "releasing" direction away from clutch pack 96 based on the direction of rotation controlled by powered driver unit 74C. While not shown, a biasing arrangement is provided for normally biasing either second cam ring 172 or pressure plate 74A in the releasing direction. A seventh bearing assembly, in the form of a radial thrust bearing unit 189, is disposed between second cam ring 172 and pressure plate 74A.

Figure 5:
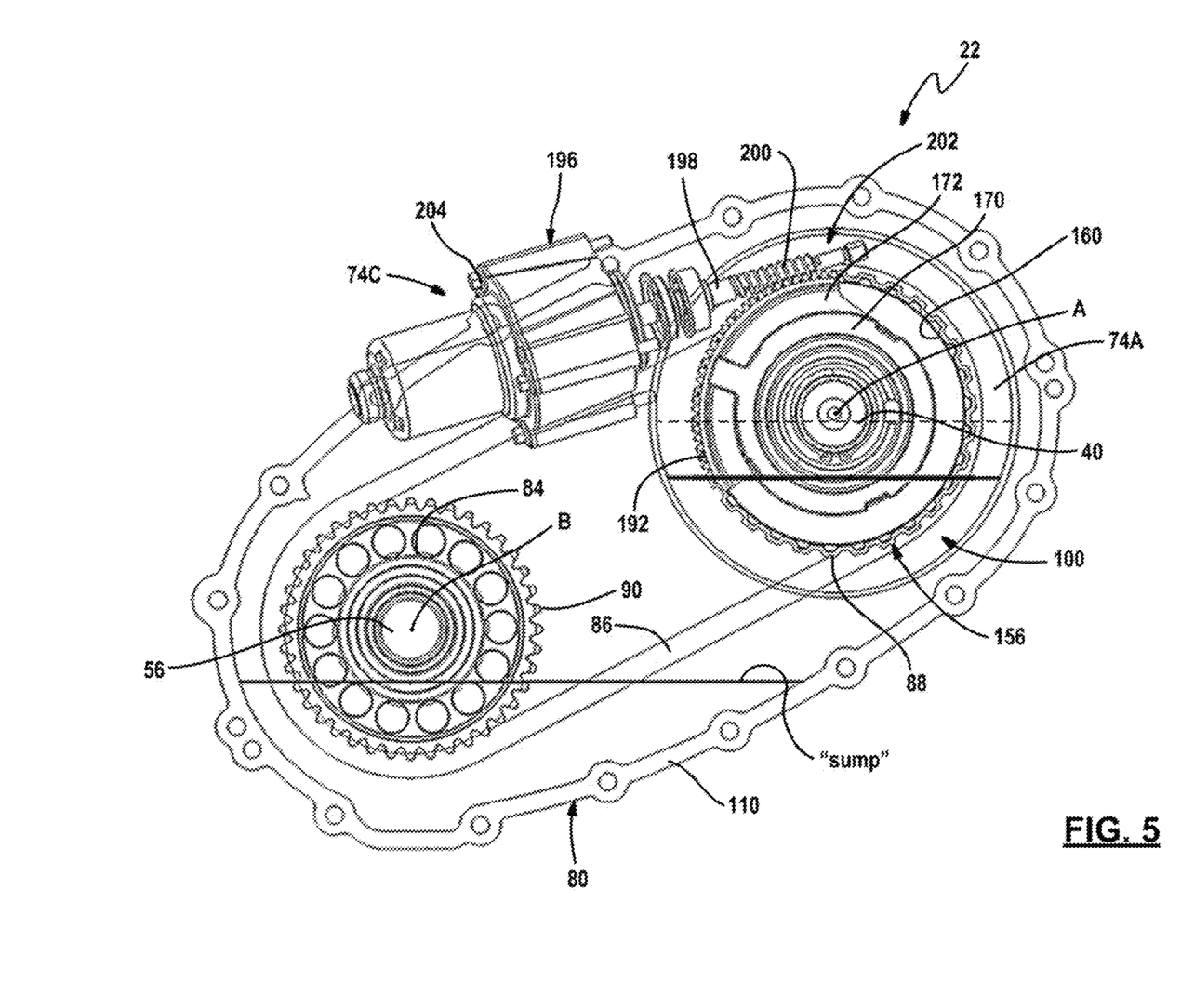
FIG. 5 is a sectional view showing a power-operated clutch actuator for actuating the multi-plate friction clutch associated with the transfer case shown in FIGS. 3 and 4.

FIG. 5 illustrates that powered driver unit 74C of clutch actuator 74 includes an electric motor 196 having a rotary motor shaft 198 driving a worm 200. Threads of worm 200 are meshed with gear teeth 192 on extension 190 to define a reduction gearset 202. Motor 196 is secured, such as by fasteners 204, to second housing section 114 of housing 80. In an alternative arrangement, powered drive unit 74C of clutch actuator 74 could drive a rotary mode cam having a profiled cam surface that is maintained in constant engagement with a non-toothed end (i.e. a follower) of extension 190 of second cam ring 172. The cam surface profile of the rotary mode cam would be configured to control rotation and axial movement of second cam ring 172 relative to first cam ring 170.

Rotation of worm 200 in a first direction causes rotation of second cam ring 172 in a first rotary direction which, in turn, causes corresponding axial movement of second cam ring 172 in its releasing direction (right in drawings) to permit the biasing spring to move pressure plate 74A in a releasing direction and place mode clutch 70 in its released mode. In contrast, rotation of worm 200 in a second rotary direction causes rotation of second cam ring 172 in a second rotary direction which, in turn, causes corresponding axial movement of second ram ring 172 in its engaging direction (left in drawings) for forcibly moving pressure plate 74A in an engaging direction for shifting mode clutch 70 from its released mode into its engaged mode. As noted, the configuration of the aligned pairs of first and second cam tracks 176, 178 acts to coordinate the relationship between rotation and axial translation of second cam ring 172 relative to first cam ring 170.

Figure 6:
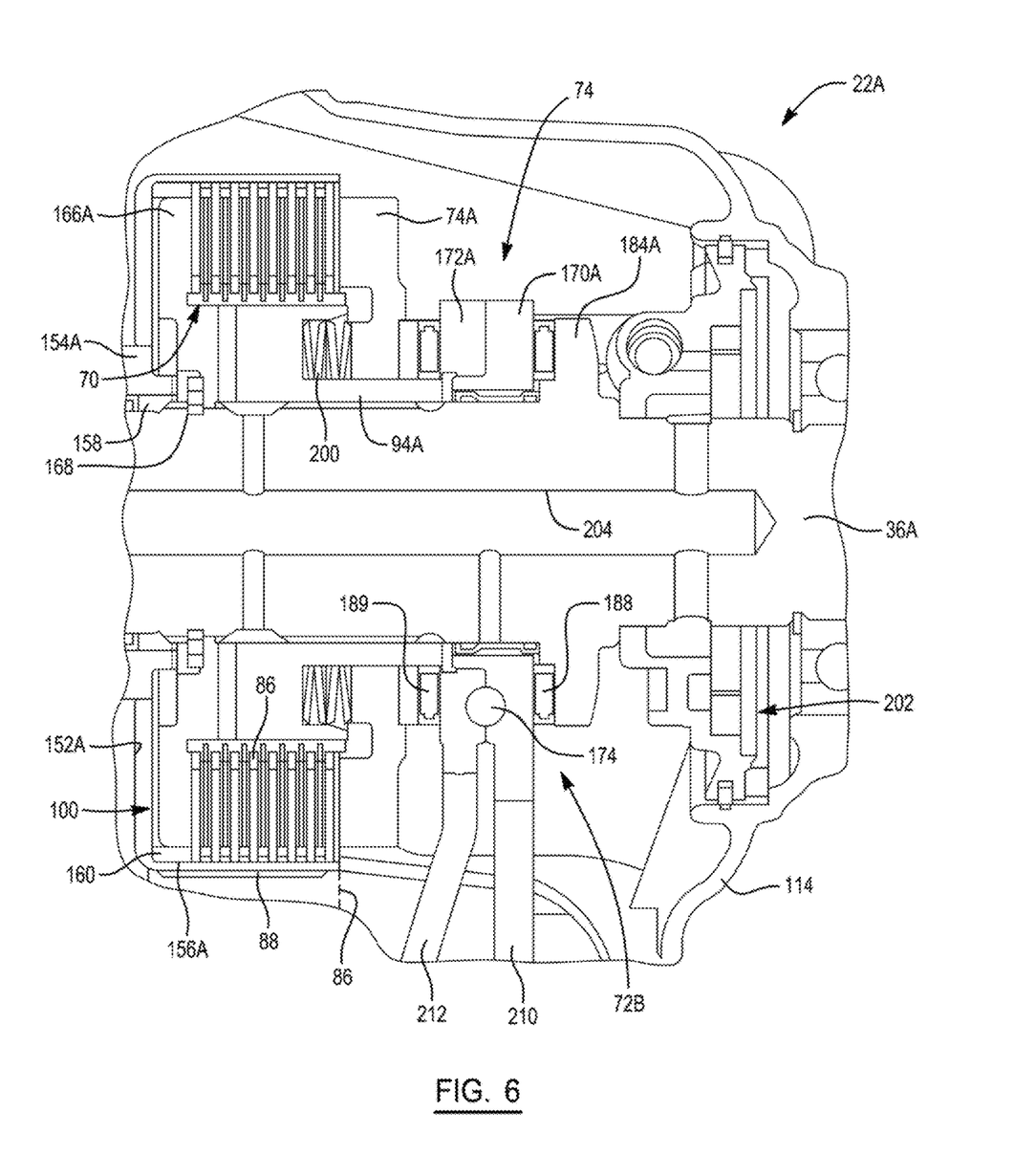
FIG. 6 is a partial sectional view of a transfer case constructed in accordance with a second non-limiting embodiment.

FIG. 6 is a partial sectional view of a slightly revised version of transfer case 22 shown in FIGS. 3 and 4, and which is identified hereafter as transfer case 22A. Similar components of transfer case 22A to those previously disclosed will be identified with common reference numerals. Transfer case 22A is now equipped with a separate clutch hub 94A that is splined to rear output shaft 36 and has reaction plate 166A integrally formed therewith. A return spring 200 is shown for 201 normally biasing pressure plate 74A in the releasing direction. A geroter lube pump 202 is driven by rear output shaft 36A and delivers lubricant from a sump to a central lube passage 205 formed in rear output shaft 36A for subsequent delivery of the lubricant to ball ramp unit 74B and mode clutch 70. Hub segment 154A of sprocket drum 100 is a separate component. Likewise, sprocket drum 100 includes a bell-shaped component which defines radial plate segment 152A and drum segment 156A. Hub segment 154A and radial plate segment 152A are rigidly secured together such as by welding.

Additionally, first cam ring 170A is shown to include a first lever extension 210 and second cam ring 172A is shown to include a second lever extension 212. Lever extensions 210, 212 extend toward and engage opposite portions of a rotary mode cam driven by powered driver unit 74C. In one arrangement, a flat end segment on first lever extension 210 engages a non-profiled portion of the rotary mode cam to prevent rotary movement of first cam ring 170A while a follower mounted to a second lever extension 212 would engage a profiled portion of the rotary mode cam to control rotary movement of second cam ring 172A relative to first cam ring 170A. In an alternative arrangement, first lever extension 210 would have a follower engaging a profiled portion of the rotary mode cam and a flat end on second lever extension 212 would engage a non-profiled portion of the mode cam, whereby rotation of first cam ring 170A relative to second cam rang 172A controls axial movement of second cam ring 172A. Finally, both lever extensions 210, 212 could engage profiled portions of the rotary mode cam to provide a "scissor-like" action controlling axial movement of second cam ring 172A relative to first cam ring 170A.

Figure 7:
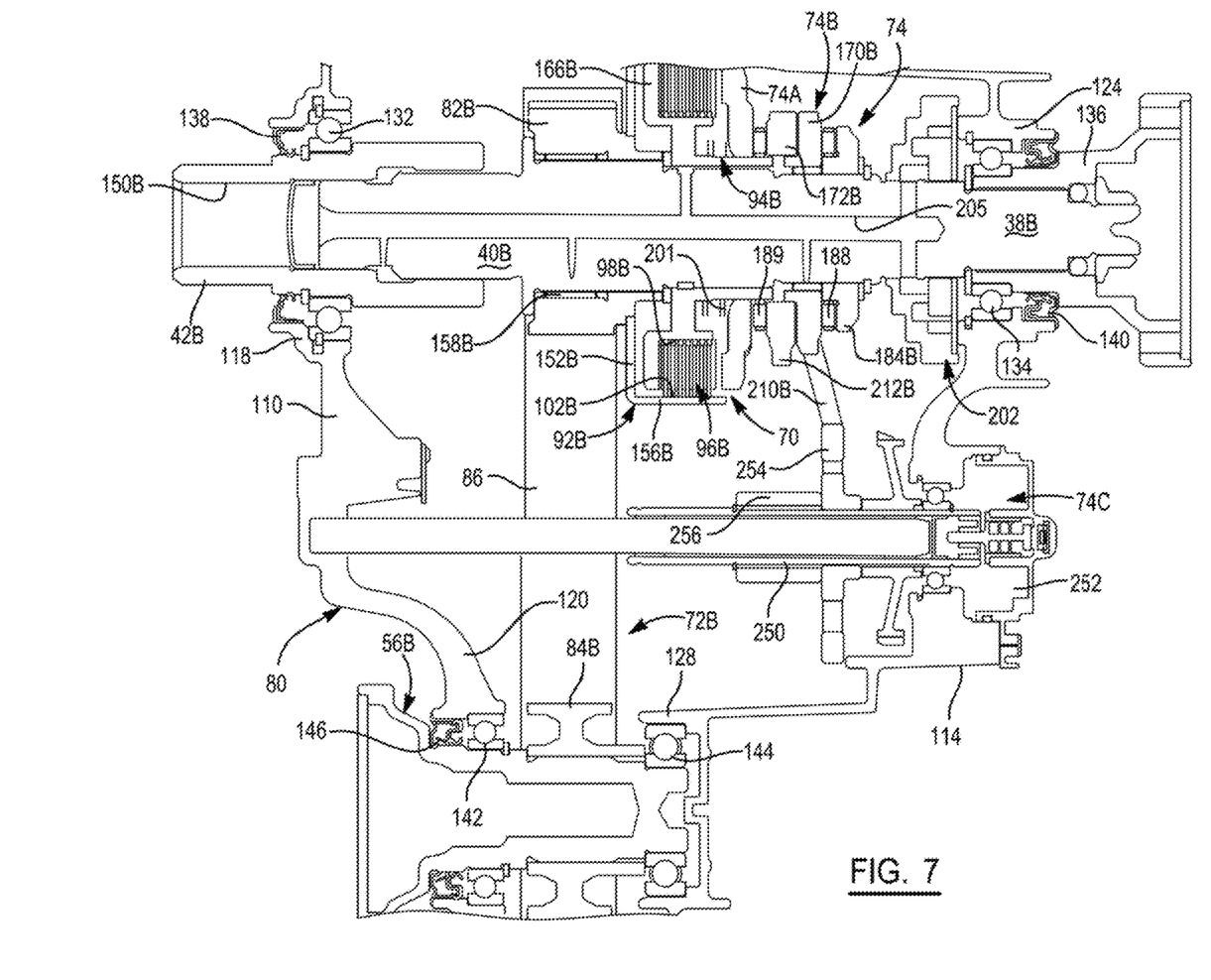
FIG. 7 illustrates a modified version of the transfer case shown in FIG. 6 and provides additional details of the power-operated clutch actuator.

Referring to FIG. 7, a sectional view of another modified version of transfer case 22A of FIG. 6 is hereinafter identified as transfer case 22B. Similar components of transfer case 22B to those previously disclosed will be identified with common reference numerals. Transfer case 22B is generally similar to transfer case 22A with the exception that first sprocket 82B is a separate component from clutch drum 92B of mode clutch 70. In addition, powered driver unit 74C of clutch actuator 74 is shown in greater detail to include a rotary actuator shaft 250 driven by an electric motor 252 and a rotary mode cam 254 fixed for rotation with actuator shaft 250. Lever extension 210B of first cam ring 170B has a follower (not shown) engaging a profiled cam surface on mode cam 254. Thus, rotation of mode cam 254 via actuation of motor 252 controls rotation of first cam ring 170B relative to second cam ring 172B. Lever extension 212B on second cam ring 172B engages a non-profiled locator collar 256 so as to be held against rotation, but still be axially moveable relative to first cam ring 170B. While not specifically shown, a plurality of first cam tracks in first cam ring 170B are each aligned with corresponding plurality of second cam tracks formed in second cam ring 172B. Balls 174B are retained between the aligned first and second cam tracks. The profile of these first and second cam tracks, in conjunction with the profile of the cam surface on rotary mode cam 254, cooperate to define the relationship between rotation of first cam rings 170B and axial movement of second cam ring 172B. Powered driver unit 74C shown in FIG. 7 is generally similar to the arrangement used to control operation of the ballramp unit shown in FIG. 6.

Figure 8:
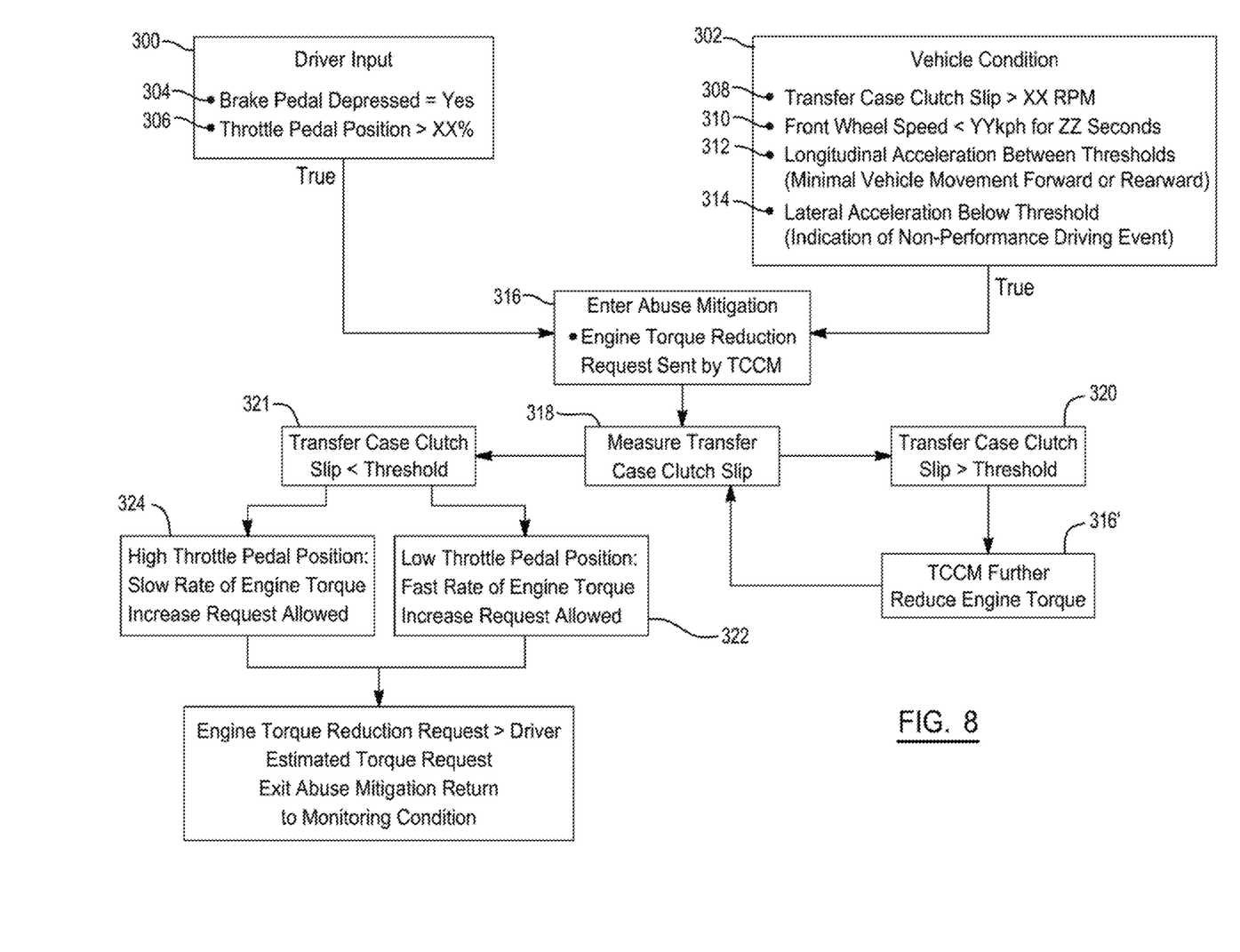
FIG. 8 is a flow diagram illustrating an exemplary condition requisite for a request by the TCCM to reduce engine torque in response to detected slip of the multi-plate friction clutch.

In operation, while in an all-wheel drive mode, as discussed above, the torque distribution ratio is based on and determined by control logic associated with TCCM 68'. In a condition of wheel/clutch slip, which can occur during simultaneous activation of a throttle control and brake control (for example, by simultaneous depression of throttle and brake pedals), by way of example and without limitation, wherein the rear wheels spin, particularly if on a road surface with a low coefficient of friction, while the front wheels remain stationary, a large differential of speed between the rear and front output shafts 36, 56 results. If gone unchecked, continued operation in the wheel/clutch slip scenario can result in damage to mode clutch 70; however, TCCM 68' detects such condition at the onset and communicates with ECM 68 to prevent such damage to mode clutch 70 from resulting via a reduced torque request sent from TCCM 68' to ECM 68, whereupon ECM 68 signals engine 18 to reduce the torque output of engine 18, thereby reducing the speed differential between the rear and front output shafts 36, 56. Prior to signaling engine 18 to reduce torque output, an algorithm is performed to check whether vehicle 10 is being driven in a "performance" (e.g. closed-course road or drag strip environment) or "non-performance" mode, and if confirmed to be in a "non-performance" mode, the signal to reduce torque is sent. Accordingly, in accordance with one non-limiting aspect, as shown in FIG. 8, two conditions are checked prior to sending a request from TCCM 68' to ECM 68 to reduce torque, namely, a "driver input condition" 300 and a predetermined "vehicle condition" 302.

The driver input condition 300 checked includes verifying that both a depressed brake pedal 304 and a depressed throttle pedal 306 a predetermined percentage (XX %) is present, and if so, then the driver input condition is met.

The vehicle condition 302 can be assigned/programmed as desired, and in one accordance with one aspect includes analysis of 4 parameters: transfer case mode clutch 70 slip 308 (differential in speed "XX RPM" between the rear and front output shafts 36, 56), vehicle speed 310, longitudinal acceleration (vehicle movement in a forward or rearward direction) 312, and lateral acceleration (vehicle movement in a side-to-side direction) 314. The vehicle speed 310 can be verified via monitoring the front wheel speed, and in accordance with one non-limiting aspect, the front wheel speed can be checked to see if the front wheel speed has been less than YY kph for ZZ seconds or more, and if yes, then this is indicative of a "non-performance" mode. The longitudinal acceleration 312 can be checked to see if the vehicle acceleration is within a predetermined acceleration, which may be $+/-NN$ m/s$^2$, for a predetermined length of time or longer, and if yes, then this is indicative of a "non-performance" mode. The lateral acceleration 314 (absolute value) is less than a threshold based on vehicle speed ($y=mx+b$ relationship, with higher threshold at low speeds when you can generate high lateral loads, and lower thresholds as speed increases), and it has been less than the threshold for the predetermined length of time or longer, and if yes, then this is indicative of a "non-performance" mode. If each of the above conditions is affirmed, a "non-performance" mode is indicated, and thus, TCCM 68' sends a request to reduce engine torque 316 to ECM 68, whereupon ECM 68, based on a set of conditions monitored thereby, such as from other vehicle sensors 64, can signal engine 18 to reduce output torque, thereby reducing the slip of the mode clutch 70.

Upon ECM 68 reducing the torque output of engine 18, monitoring 318 of the mode clutch 70 slip continues, and until the slip condition is resolved, so too does the request for continued torque reduction from the TCCM 68' to ECM 68 as indicated at 316' as long as the mode clutch 70 slip remains above a predetermined threshold 320. Upon detecting the slip of mode clutch 70 is no longer above the predetermined threshold as indicated at 321, TCCM 68' will reduce the demand for torque reduction, and depending on the position of the throttle pedal detected, the rate of reduced demand can be varied. For example, when the mode clutch 70 slip has ceased, and if the throttle pedal position is detected as being only slightly depressed/activated, corresponding to a "low throttle pedal position 322," the rate of increase of torque requested by TCCM 68' to ECM 68 will be relatively high, as the corresponding increase in engine torque will be relatively and perceivably low and thus, will not cause instability of the vehicle 10 or alarming surprise to the driver. On the other hand, when the mode clutch 70 slip has ceased, and if the throttle pedal position is detected as being more than slightly depressed/activated, corresponding to a "high throttle pedal position 324," the rate of increase of torque requested by TCCM 68' to ECM 68 will be relatively low, as the corresponding increase in engine torque would be relatively high and readily perceived by the driver, and thus, could cause instability of the vehicle 10 or alarming surprise to the driver. Accordingly, by requesting a gradual, slow rate of torque increase from TCCM 68' to ECM 68 during a high throttle position 324, vehicle stability is maintained and alarming surprise to the driver is avoided. In either case, the increase of engine torque request from TCCM 68' to ECM 68 continues until, as indicated at 326, the engine torque reduction request is greater than the driver estimated torque request (obtained via throttle pedal position and real-time engine output torque), at which time a normal mode of vehicle operation is reached, and monitoring can continue.

In view of the above, the clutch protection system provides several advantages including preventing the potential for inadvertent damage to mode clutch 70 via electrical communication between vehicle control systems; preventing vehicle instability by gradually changing torque throughout the driveline during slip conditions, in contrast to mechanisms causing a sudden shift of torque from 4 wheels to 2 wheels and vice versa; reducing the amount of sudden change in torque at the wheels, which in turn avoids the potential for wheel slip (loss of traction) with the road surface; and providing the driver with an indication of a tire/clutch slip condition in response to a depressed throttle pedal that allows the driver to react accordingly, thereby avoiding potential damage to mode clutch 70 and further providing the driver with an ability to react to road conditions causing wheel/clutch slip.

Figure 9:
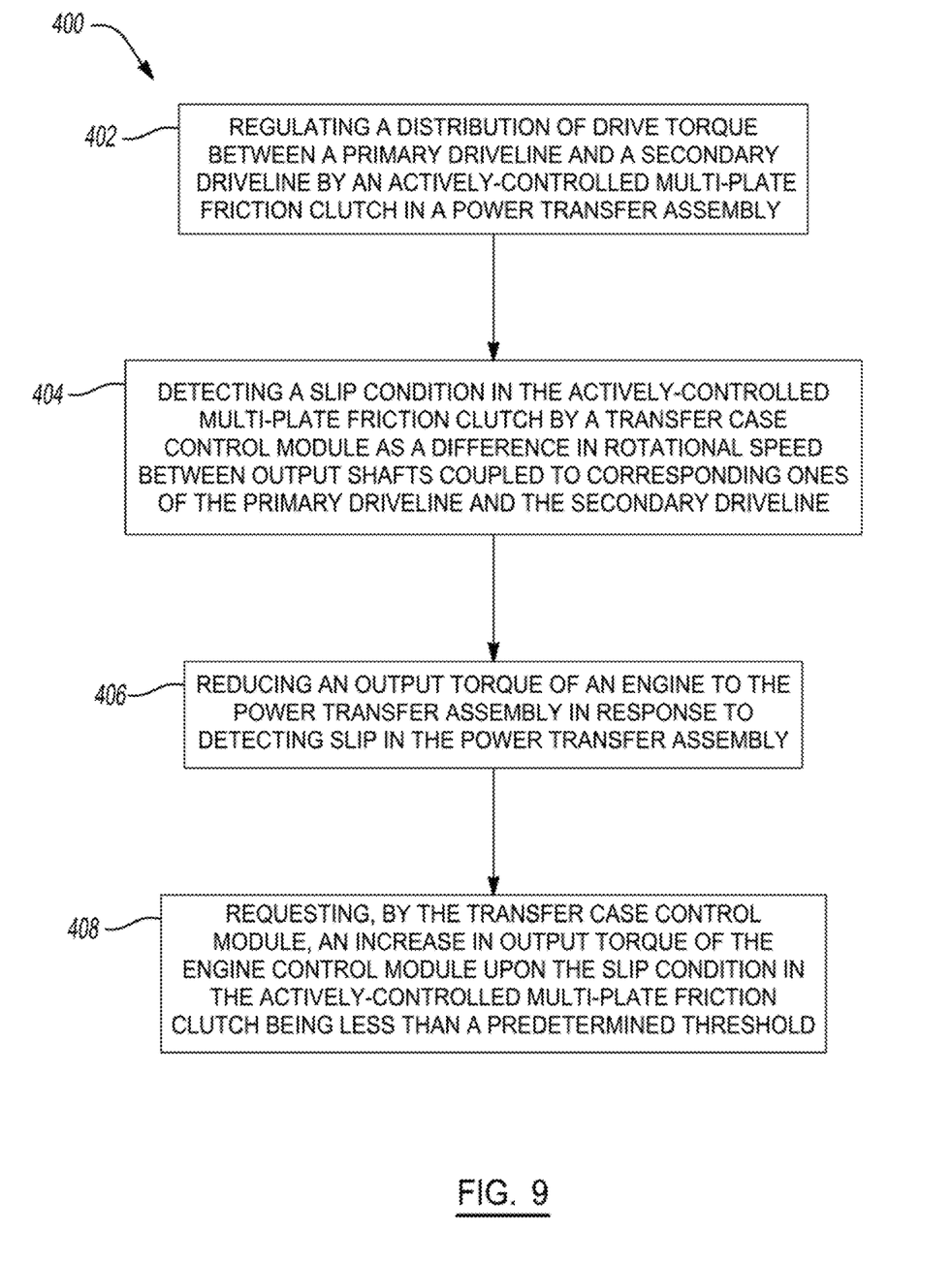
FIG. 9 is a flow chart listing steps in an example method of controlling a powertrain of a motor vehicle.

As described in the flow chart of FIG. 9, a method 400 of controlling a powertrain of a motor vehicle is also provided.

The method 400 includes 402 regulating a distribution of drive torque between a primary driveline 14 and a secondary driveline 16 by an actively-controlled multi-plate friction clutch in a power transfer assembly. This step may be performed by as transfer case 22, as described above.

The method 400 includes 404 detecting a slip condition in the actively-controlled multi-plate friction clutch by a transfer case control module 68' as a difference in rotational speed between output shafts coupled to corresponding ones of the primary driveline 14 and the secondary driveline 16.

The method 400 also includes 406 reducing an output torque of an engine to the power transfer assembly in response to detecting slip in the power transfer assembly.

The method 400 may also include 408 requesting, by the transfer case control module 68', an increase in output torque of the engine control module 68 upon the slip condition in the actively-controlled multi-plate friction clutch being less than a predetermined threshold. In some embodiments, the transfer case control module 68' may request a relatively fast increase in engine torque output from the engine control module upon the slip condition in the actively-controlled multi-plate friction clutch being less than the predetermined threshold and when a throttle control, such as a throttle pedal, is in a low throttle position. In some embodiments, the transfer case control module 68' may request a relatively slow gradual increase in engine torque output from the engine control module upon the slip condition in the actively-controlled multi-plate friction clutch being less than the predetermined threshold and when the throttle control is in a high throttle position.

In some embodiments, the output torque of the engine may be reduced in response to a signal from one or more vehicle sensors other than the actively-controlled multi-plate friction clutch. In some embodiments, the output torque of the engine may be reduced in response to a predetermined driver input condition representing one or more control inputs from a driver of the motor vehicle and a predetermined vehicle condition. The predetermined driver input condition may include, for example, a brake control being activated and simultaneously a throttle control being activated. The brake control being activated may include a brake pedal being depressed, and/or a parking or emergency brake being activated. The throttle control being activated may comprise the throttle pedal being depressed. The predetermined vehicle condition may include one or more of: a slip condition in the actively-controlled multi-plate friction clutch, a vehicle speed below a predetermined threshold, a longitudinal acceleration of the vehicle below a predetermined threshold, and/or a lateral acceleration of the vehicle below a predetermined threshold.

In some embodiments, the output torque of the engine may be reduced until the slip in the actively-controlled multi-plate friction clutch is less than a predetermined threshold.

The foregoing description of the several embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Those skilled in the art will recognize that concepts disclosed in association with the example clutch protection system can likewise be implemented into many other systems to control one or more operations and/or functions.

What is claimed is:

1. In a motor vehicle having a powertrain normally transmitting drive torque to a primary driveline, a power transfer assembly operable to selectively transmit drive torque to a secondary driveline, the power transfer assembly comprising:
   an actively-controlled multi-plate friction clutch;
   a power-operated clutch actuator operable to apply a clutch engagement force to the actively-controlled multi-plate friction clutch to regulate distribution of torque to the secondary driveline;
   an engine control module configured to regulate the output torque of the powertrain; and
   a transfer case control module in operable communication with the power-operated clutch actuator, the transfer case control module being in operable communication with the engine control module, and wherein transfer case control module is configured to detect slip in the actively-controlled multi-plate friction clutch and to communicate with the engine control module to request a reduction of the output torque of the powertrain in response to detected slip in the actively-controlled multi-plate friction clutch.

2. The power transfer assembly of claim 1, wherein the transfer case control module is configured to reduce the output torque of the powertrain via communication with the engine control module in response to signals from vehicle sensors other than from the actively-controlled multi-plate friction clutch.

3. The power transfer assembly of claim 1, wherein the transfer case control module is configured to request a reduction in output torque from the engine control module upon detecting a predetermined driver input condition representing one or more control inputs from a driver of the motor vehicle and a predetermined vehicle condition.

4. The power transfer assembly of claim 3, wherein the predetermined driver input condition includes a brake control being activated and simultaneously a throttle control being activated.

5. The power transfer assembly of claim 4, wherein the predetermined vehicle condition includes a slip condition in the actively-controlled multi-plate friction clutch, and at least one of: a vehicle speed below a predetermined threshold, a longitudinal acceleration of the vehicle below a predetermined threshold, or a lateral acceleration of the vehicle below a predetermined threshold.

6. The power transfer assembly of claim 1, wherein the transfer case control module is configured to maintain the request to the engine control module for a reduction in output torque until the slip condition in the actively-controlled multi-plate friction clutch is less than a predetermined threshold.

7. The power transfer assembly of claim 1, wherein the transfer case control module is configured to request an increase in output torque from the engine control module upon the slip condition in the actively-controlled multi-plate friction clutch being less than a predetermined threshold.

8. The power transfer assembly of claim 7, wherein the transfer case control module is configured to request a relatively fast increase in engine torque output from the engine control module upon the slip condition in the actively-controlled multi-plate friction clutch being less than the predetermined threshold and when a throttle control of the motor vehicle is in a low throttle position.

9. The power transfer assembly of claim 7, wherein the transfer case control module is configured to request a relatively slow gradual increase in engine torque output from the engine control module upon the slip condition in the actively-controlled multi-plate friction clutch being less than the predetermined threshold and when a throttle control of the motor vehicle is in a high throttle position.

10. In a motor vehicle having a powertrain normally transmitting drive torque from an engine to a primary driveline, a power transfer assembly operable to selectively transmit drive torque to a secondary driveline, the power transfer assembly comprising:
an actively-controlled multi-plate friction clutch;
a power-operated clutch actuator operable to apply a clutch engagement force to the actively-controlled multi-plate friction clutch to regulate distribution of torque to the secondary driveline;
an engine control module configured to regulate an output torque of the engine; and
a transfer case control module in operable communication with the power-operated clutch actuator, the transfer case control module being in operable communication with the engine control module, and wherein transfer case control module is configured to detect slip in the actively-controlled multi-plate friction clutch and to communicate with the engine control module to request a reduction of the output torque of the engine in response to detected slip in the actively-controlled multi-plate friction clutch.

11. The power transfer assembly of claim 10, wherein the transfer case control module is configured to request a reduction in output torque from the engine control module upon detecting a predetermined driver input condition representing one or more control inputs from a driver of the motor vehicle and a predetermined vehicle condition.

12. A method of controlling a powertrain of a motor vehicle comprising:
regulating a distribution of drive torque between a primary driveline and a secondary driveline by an actively-controlled multi-plate friction clutch in a power transfer assembly;
detecting a slip condition in the actively-controlled multi-plate friction clutch by a transfer case control module as a difference in rotational speed between output shafts coupled to corresponding ones of the primary driveline and the secondary driveline;
reducing an output torque of an engine to the power transfer assembly in response to detecting slip in the power transfer assembly.

13. The method of claim 12, wherein the output torque of the engine is reduced in response to a signal from one or more vehicle sensors other than the actively-controlled multi-plate friction clutch.

14. The method of claim 12, wherein the output torque of the engine is reduced in response to a predetermined driver input condition representing one or more control inputs from a driver of the motor vehicle and a predetermined vehicle condition.

15. The method of claim 14, wherein the predetermined driver input condition includes a brake control being activated and simultaneously a throttle control being activated.

16. The method of claim 14, wherein the predetermined vehicle condition includes a slip condition in the actively-controlled multi-plate friction clutch, and at least one of: a vehicle speed below a predetermined threshold, a longitudinal acceleration of the vehicle below a predetermined threshold, or a lateral acceleration of the vehicle below a predetermined threshold.

17. The method of claim 12, wherein, the output torque of the engine is reduced until the slip in the actively-controlled multi-plate friction clutch is less than a predetermined threshold.

18. The method of claim 12, further comprising:
requesting, by the transfer case control module, an increase in output torque of the engine control module upon the slip condition in the actively-controlled multi-plate friction clutch being less than a predetermined threshold.

19. The power transfer assembly of claim 18, wherein the transfer case control module requests a relatively fast increase in engine torque output from the engine control module upon the slip condition in the actively-controlled multi-plate friction clutch being less than the predetermined threshold and when a throttle control is in a low throttle position.

20. The power transfer assembly of claim 18, wherein the transfer case control module requests a relatively slow gradual increase in engine torque output from the engine control module upon the slip condition in the actively-controlled multi-plate friction clutch being less than the predetermined threshold and when a throttle control is in a high throttle position.

* * * * *